United States Patent [19]

Anorga et al.

[11] 3,909,464

[45] Sept. 30, 1975

[54] FLAME RETARDANT FLEXIBLE POLYANETHANE FOAM CONTAINING ALUMINA TRIHYDRATE

[75] Inventors: Carlos J. Anorga, San Pedro; Samuel Chess, Palos Verdes Estates, both of Calif.

[73] Assignee: The Upjohn Company, Kalamazoo, Mich.

[22] Filed: Mar. 20, 1974

[21] Appl. No.: 452,752

[52] U.S. Cl..... 260/2.5 AJ; 260/2.5 K; 260/2.5 AT; 260/2.5 BE
[51] Int. Cl.$^2$......................................... C08G 18/76
[58] Field of Search.... 260/2.5 AJ, 2.5 AT, 2.5 AK, 260/2.5 BE

[56] References Cited
UNITED STATES PATENTS 3,738,953  6/1973  Anorga et al. ................. 260/2.5 AJ
3,810,851  5/1974  Norman et al. ................. 260/2.5 AJ Primary Examiner—M. J. Welsh
Attorney, Agent, or Firm—James S. Rose

[57] ABSTRACT

Flexible polyurethane foams are described which have outstanding flame retardant properties. The foams are the product of reaction, under foam producing conditions, of a combination of (a) a mixture of toluene diisocyanate and polymethylene polyphenyl isocyanate; (b) a polyether polyol; (c) antimony oxide; (d) a polyhalogenated aromatic compound and (e) alumina trihydrate. The foams meet the very stringent tests for fire retardance required of seat cushioning, mattresses, and like materials in aircraft, institutions such as hospitals, convalescent homes and the like.

11 Claims, No Drawings

FLAME RETARDANT FLEXIBLE POLYANETHANE FOAM CONTAINING ALUMINA TRIHYDRATE

BACKGROUND OF THE INVENTION

1. Field of the Invention

This invention relates to cellular polyurethanes and is more particularly concerned with flame retardant flexible polyurethane foams and with processes for their preparation.

2. Description of the Prior Art

The use of antimony oxide, alone or in combination with other additives, to impart fire retardance to flexible polyurethane foams is well-known. Illustratively, British Specification No. 1,079,984 shows the use of a combination of antimony oxide and hexahalobenzenes in the preparation of fire retardant flexible foams. U.S. Pat. No. 3,075,927 shows a combination of antimony oxide and a vinyl halide as fire retardants in foams prepared from aromatic polyethers. U.S. Pat. Nos. 3,075,928 and 3,222,305 show the same combination in foams prepared from aliphatic polyethers and from polyamines, respectively.

U.S. Pat. No. 3,574,149 describes a combination of antimony oxide, zinc oxide made by the "French process," and a chlorinated polymer in polyether-based flexible foams. The zinc oxide is said to exert a synergistic effect in the combination.

More recently U.S. Pat. No. 3,738,953 described the use of a synergistic mixture of flame retardants, namely, a mixture of antimony oxide, a polyhalogenated aromatic component or polybrominated diol, and a highly chlorinated hydrocarbon polymer, in the preparation of flexible foams which meet the very straight tests required for use of such foams as cushioning, mattresses and the like in public institutions, military installations and the like.

Unfortunately, a number of difficulties, unrelated to flame retardant performance, were encountered in preparing flexible foam in the form of continuous bunstock using the formulations described in the above cited U.S. Pat. No. 3,738,953. Chief amongst these difficulties was the development of highly undesirable colors in the foam apparently due to the interaction of degradation products of the highly chlorinated hydrocarbon polymer with the antimony oxide. A further difficulty lies in the fact that the most convenient way to operate in the continuous bunstock fabrication involves blending of the various flame retardants with the polyol component prior to reaction of the latter with the polyisocyanate. Unfortunately, it is found that the polyhalogenated aromatic compounds are not stable upon storage for more than a few hours with the polyol components and tend to release hydrohalic acids which interfere with desired performance of the catalyst.

We have now found that these difficulties can be obviated, without any loss in desirable flame retardancy or physical properties, by elimination of the highly chlorinated hydrocarbon polymer and by introduction of a controlled quantity of alumina trihydrate.

SUMMARY OF THE INVENTION

This invention comprises flame retardant flexible polyurethane foams which comprise the product of reaction, under foam producing conditions, of:

a. a polyisocyanate mixture which contains from 5 percent to 95 percent by weight of toluene diisocyanate, and from 95 percent to 5 percent by weight of polymethylene polyphenyl polyisocyanate containing from about 40 percent to about 70 percent of methylenebis (phenyl isocyanate), the remainder of said polymethylene polyphenyl polyisocyanates having functionality higher than 2.0;

b. a polyether polyol having an equivalent weight from about 500 to about 2500 and a functionality from about 2 to about 4;

c. from about 2 to about 20 percent by weight, based on weight of final foam, of antimony oxide;

d. from about 1 to about 15 percent by weight, based on weight of final foam, of a polyhalogenated aromatic compound; and e. from about 1 to about 15 percent by weight, based on weight of final foam, of alumina trihydrate.

The invention also comprises processes for the preparation of the above foams.

Alumina trihydrate ($Al_2O_3$, $3H_2O$) is a form of hydrated aluminum oxide which is well-known and readily available.

DETAILED DESCRIPTION OF THE INVENTION

The flexible polyurethane foams of the invention are prepared using techniques well-recognized in the art (see, for example, Saunders et al. Polyurethanes: Chemistry and Technology, Part II, pages 1–191, Interscience Publishers, New York, 1964). However, criticality resides in the particular combination of reactants employed in accordance with the invention. The term "flexible polyurethane foam" as used herein has the meaning normally attributed to this term; see U.S. Pat. No. 3,738,953.

The polyisocyanates which are employed in preparing the fire retardant polyurethane foams of the invention are particular mixtures, the use of which is a factor in obtaining the desired flame retardancy in the foams of the invention. The mixture of polyisocyanates in question is comprised of (1) from 5 percent to 95 percent by weight of toluene diisocyanate and (2) from 95 percent to 5 percent by weight of polymethylene polyphenyl polyisocyanates containing from about 40 percent to about 70 percent by weight of methylenebis (phenyl isocyanate). The toluene diisocyanate employed in the above mixtures can be present as 2,4-isomer or the 2,6-isomer or mixtures thereof such as the mixtures containing 80 percent by weight of the 2,4-isomer and 20 percent of the 2,6-isomer, and those containing 65 percent by weight of the former and 35 percent of the latter, both of which are commonly available commercially.

The polymethylene polyphenyl isocyanates set forth above are well-known in the art and can be prepared in accordance with conventional techniques by phosgenation of the corresponding mixtures of methylene-bridged polyphenyl polyamines. The latter are obtained by condensation of aniline and formaldehyde in the presence of aqueous mineral acid, usually hydrochloric acid, by procedures known in the art; see, for example, Canadian Pat. No. 700,026; U.S. Pat. Nos. 2,950,263 and 3,012,008; and German Specification No. 1,131,877. As is well known in the art, the desired proportion of methylenebis (phenyl isocyanate) in the polymethylene polyphenyl isocyanate is attained by controlling the proportion of methylene dianilines in the intermediate polyamine, and the latter proportion is, in turn, controlled by adjusting the ratio of aniline to formaldehyde in the initial condensation of these components.

A particularly preferred combination of polyisocyanates for use in preparing flexible foams in accordance with the invention is a mixture containing approximately 65 to 75 percent by weight of toluene diisocyanate, the remainder of said mixture being polymethylene polyphenyl polyisocyanate containing approximately 50 percent by weight of methylenebis (phenyl isocyanate).

The polyols which are employed in making the flexible foams of the invention are polyether polyols having an equivalent weight of about 500 to about 2500 and a functionality of about 2 to about 4. Mixtures of these polyols can be used if desired and it is usually possible to control cell opening to some degree by such means. Proportions are not critical but it is usually found advantageous when using a mixture of two polyols of differing equivalent weight to employ the higher equivalent weight material in a range of from about 60 to 80 percent by weight of the polyol mixture while the lower equivalent weight material will be about 20 to about 40 percent by weight of said polyol mixture. Preferably the polyether polyols employed in preparing the flexible foams of the invention are triols having an equivalent weight of about 900 to about 2300.

The above types of polyether polyols are well known in the art as are the methods for their preparation. Said polyether polyols include polyoxyalkylene glycols such as the polyoxyethylene glycols prepared by the addition of ethylene oxide to water, ethylene glycol or diethylene glycol; polyoxypropylene glycols prepared by the addition of 1,2-propylene oxide to water, propylene glycol or dipropylene glycol; mixed oxyethylene oxypropylene glycols prepared in a similar manner utilizing a mixture of ethylene oxide or propylene oxide or a sequential addition of ethylene oxide and 1,2-propylene oxide; polyether glycols prepared by reacting ethylene oxide, propylene oxide or mixtures thereof with mono- and polynuclear dihydroxybenzenes, e.g. catechol, resorcinol, hydroquinone, orcinol, 2,2-bis(p-hydroxyphenyl) propane, bis(p-hydroxyphenyl)methane, and the like; and polyethers prepared by reacting ethylene oxide, propylene oxide, or mixtures thereof, with aliphatic polyols such as glycerol, sorbitol, trimethylolpropane, 1,2,6-hexanetriol, pentaerythritol and the like.

In order to produce those flexible foams of the invention which are classified as semi-flexible as discussed hereinabove, it is necessary to include in the polyol component a low molecular weight polyol having a functionality of 3 or higher, preferably from 3 to 6, and a molecular weight from about 90 to about 800 in order to increase the degree of cross-linking and thereby, in part, increase the load bearing capacity and lower the elongation of the resulting foam. The proportion of cross-linking agent introduced into the polyol component varies according to the properties desired on the resulting foam. Generally speaking, the amount of cross-linking agent employed can vary from about 2 percent to about 30 percent by weight of the total polyol employed. Examples of cross-linking polyols having a functionality of 3 to 6 are glycerol, pentaerythritol, hyroxyalkylated aliphatic diamines such as N,N,N',N'-tetrakis (2-hydroxypropyl) ethylene diamine, N,N,N',N'-tetrakis (2-hydroxyethyl) ethylene diamine, and the like, and low molecular weight (within the above cited range) alkylene oxide adducts of glycerol, trimethylolpropane, hexane-1,2,3-triol, sucrose, sorbitol, methyl glucoside, and the like.

Said cross-linking polyols can be admixed with the other polyol or mixture of polyols prior to formation of the polyurethane or can be fed into the foam mix as a separate stream during the mixing stage of a one-shot procedure.

The antimony oxide is employed in making the fire retardant foams of the invention in amounts such that the resulting foam will contain from about 2 to about 20 percent by weight. Preferably, the amount of antimony oxide employed is such that the resulting foam contains from about 5 to about 15 percent by weight. The antimony oxide is generally introduced into the foam mix by blending, in the form of a finely divided powder, with the polyol component prior to the addition of the latter to the foam reaction mix.

The "polyhalogenated aromatic compound" employed in preparing the fire retardant flexible foams of the invention is inclusive of polyhalogenated aromatic diamines such as 3,3'-dichlorobenzidine, 2,3,2',3'-tetrachlorobenzidine, 3,3'-dibromobenzidine, methylenebis-(2-chloroaniline), methylenebis (2,3-dichloroaniline), methylenebis (2,6-dichloroaniline), and the like, polyhalogenated benzenes such as tetrachlorobenzene, hexachlorobenzene, tetrabromobenzene, hexabromobenzene, decabromodiphenyl ether, pentabromoethylbenzene, and the like, polyhalogenated bisphenol-A such as tetrachloro- and tetrabromo-bisphenol-A, dichlorodibromobisphenol-A, and the like. The preferred polyhalogenated aromatic compounds are polybrominated hydrocarbons which are insoluble in water, have a melting point above about 50°C and contain at least 60 percent by weight of bromine. The most preferred polyhalogenated aromatic compounds are hexabromobenzene, decabromodiphenyl ether, and pentabromoethylbenzene.

The polyhalogenated aromatic compound is employed in making the fire retardant foams of the invention in amounts such that the resulting foam will contain from about 1 to about 15 percent by weight thereof. Preferably, the amount of polyhalogenated compound employed is such that the resulting foam contains from about 2 to about 10 percent by weight. The polyhalogenated compound is generally introduced into the foam mix in the same manner as the antimony oxide, namely, as a dispersion in the polyol component.

The alumina trihydrate is employed in the foams of the invention in an amount within the range of about 1 percent by weight to about 15 percent by weight based on total weight of foam. Preferably the amount of alumina trihydrate is within the range of about 2 percent by weight to about 10 percent by weight based on total weight of foam. The alumina trihydrate is generally available in free flowing powder form and preferably is introduced into the foam reaction mixture in the same manner as the antimony oxide, i.e. it is preblended with the polyol component of the foam reaction mixture.

The alumina trihydrate serves at least two functions in the production of the flame retardant foams of the invention. Not only does it contribute significant flame retardancy but, when preblended with the other flame retardants in admixture with the polyol, it serves to stabilize the latter blend and obviates the problems previously encountered because of the tendency of the polyhalogenated aromatic compound to decompose upon storage in admixture with the polyol.

The function of alumina trihydrate in stabilizing the polyol preblend and providing fire resistant flexible foams of the invention possessing excellent physical properties is unique to this oxide. When it is replaced by oxides of alkaline and alkaline earth metals in such amounts so as to neutralize the preblend acidity, the foam reaction rates cannot be properly controlled and the resulting flexible foams possess poor physical properties, e.g., compression set and indentation load deflection. Further, and surprisingly, the introduction of the alumina trihydrate does not have any significant deleterious effect on the desirable physical properties of the resulting foams, indeed it results in improved physical properties including improved compression set, and indentation load deflection.

The proportion of equivalents of polyisocyanate to equivalents of active hydrogen-containing material employed in making the flexible polyurethane foams of the invention is generally within normal limits, i.e. from about 1.0:1.0 to about 1.3:1.0. Preferably, the proportion is about 1.0:1.0.

Any of the catalysts conventionally employed in the art to catalyze the reaction of apolyol and an isocyanate can be employed as catalyst in the preparation of the flexible foams of this invention. Such catalysts are described, for example, by Saunders et al. ibid, Part I, pages 228–232, and by Britain et al., J. Applied Polymer Science, 4, pages 207–211, 1960. Such catalysts include organic and inorganic salts of, and orgnaometallic derivatives of, bismuth, lead, tin, iron, antimony, uranium, cadmium, cobalt, thorium, aluminum, mercury, zinc, nickel, cerium, molybdenum, vanadium, copper, manganese, and zirconium, as well as phosphines and tertiary organic amines. Representative organotin catalysts are stannous octoate, stannous oleate, dibutyltin dioctoate, dibutyltin dilaurate, and the like. Representative tertiary organic amine catalysts are triethylamine, triethylenediamine, N,N,N',N'-tetramethylethylenediamine, N,N,N',N'-tetraethylethylenediamine, N-methylmorpholine, N-ethylmorpholine, N,N,-N',N'-tetramethylguanidine, N,N,N',N'-tetramethyl-1,3-butanediamine, N,N-dimethylethanolamine, N,N-diethylethanolamine, 2,2'-bis(dimethylamino)diethyl ether and the like. The preferred catalysts for use in the process of the invention are a combination of stannous octoate with at least one of the tertiary amines selected from N,N,N',N'-tetramethyl-1,3-butane diamine, 2,2'-bis(dimethylamino)diethyl ether, and triethylenediamine, or a combination of the latter two amines. The amount of catalyst employed is generally within the range of about 0.1 to about 2 percent by weight based on the total weight of reactants.

The blowing agents which can be employed in the process of the invention are those conventionally employed in the preparation of flexible polyurethane foams. Illustrative of said blowing agents are water (which generates carbon dioxide by reaction with isocyanate) and volatile solvents such as the lower molecular weight aliphatic hydrocarbons and highly halogenated lower-aliphatic hydrocarbons, for example trichloromonofluoromethane, dichlorodifluoromethane, chlorotrifluoromethane, 1,1-dichloro-1-fluoroethane, 1-chloro-1,1-difluoro-2,2-dichloroethane, and 1,1,1-trifluoro-2-chloro-2-fluoro-butane, and the like. If desired, a mixture of water and one or more of said volatile solvents can be used as blowing agent. The final foam density of the flexible foams produced by the process of the invention is a function of the amount of blowing agent used. In general the higher the amount of blowing agent, the lower the density of the foam. Illustratively when water is used as the sole blowing agent, the amount of water required to produce a low density foam for use, for example, as a sponge type material is generally of the order of about 1.5 to about 5.0 parts per hundred parts of total polyol. When a semiflexible foam of higher density is required, the amount of water employed as sole blowing agent is of the order of about 0.5 to about 1.5 parts per hundred parts of total polyol.

In the preferred mode of preparation of the flexible foams of the invention, namely the one-shot procedure, the mixing of the polyol, polyisocyanate mixture, catalyst and gas forming agent is accomplished by high speed stirring or by injecting the reactants in separate streams simultaneously into a mixing area under conditions of rapid and efficient mixing which can be supplied by high turbulence or high shearing or stirring action. The number of streams can be reduced by combining those constituents of said mixture which do not enter into chemical reaction upon admixture. A common method of operation employs one stream containing the polyol components and combined flame retardants and any volatile solvent blowing agent, a second stream comprising the polyisocyanate mixture, a third stream containing water, surface active agent (if used) and catalyst.

If desired, a prepolymer technique can be employed in place of the "one-shot" procedure described above. In the prepolymer technique the polyisocyanate mixture is reacted in a preliminary step with a portion of the polyol (up to about 0.5 equivalents of polyol per equivalent of isocyanate) and the isocyanate-terminated prepolymer is used in the reaction with the remainder of the foam components using the techniques described above.

Optional additives such as dispersing agents, cell stabilizers, surfactants, and the like which are commonly employed in the fabrication of flexible polyurethane foams, can be employed in the process of the invention. Thus, a finer cell structure can be obtained if water-soluble organosilicone polymers are used as surfactants. Organosilicone polymers obtained by condensing a polyalkoxy polysilane with the monoether of a polyalkylene ether glycol in the presence of an acid catalyst are representative of those surfactants which can be used for this purpose. Other surfactants such as ethylene oxide modified polypropylene ether glycols can be used, if desired, to obtain better dispersion of the components of the foam mixture.

Other additives such as dyes, pigments, soaps and metallic powders and other inert fillers can be added to the foam mixture to obtain special foam properties in accordance with practices well-known in the art.

The flexible polyurethane foams produced by the process of the invention are high quality foams useful for a variety of purposes in which fire retardant flexible foams are required. The foams of the invention are particularly useful for cushioning and for mattresses to be used in locations in which strict compliance with fire safety codes is required. In particular, the flexible foams of the invention are found to pass the very stringent test known as the "hot bolt" test which was devised specifically to determine behavior of the above materials on exposure to burning objects such as cigarette butts and the like; see Mil R-20092F [Military Specification Mil R-20092F (20 July 1970) fire resistance requirement 3.5.10, fire resistance test 4.4.9 (hot bolt)]. In this test a steel bolt preheated to 800°C is dropped on to a foam block of predetermined thickness. The bolt passes through the foam very rapidly and the extent to which the foam burns, or does not burn, after this sudden exposure to an intensly hot object is a clear measure of the flame retardancy, or lack of it, in the foam. To pass the test requires that the foam be self-extinguishing within 10 seconds of the initial exposure to the hot bolt.

The flexible polyurethane foams of the invention can be fabricated in any manner and on any scale without difficulty. In particular, they can be fabricated in the form of continuous bunstock without any undue difficulty or deterioration in physical properties or appearance. This is in marked contrast to the closely related foams of the aforesaid U.S. Pat. No. 3,738,953 which, although possessing outstanding flame retardance, are not readily fabricated as continuous bunstock and are possessed of undesirable color apparently due to reaction of the antimony oxide with the degradation products of the chlorinated hydrocarbon polymer. Further, as discussed above, the flame retardants employed in preparing the foams of the present invention, can be stored for prolonged periods in admixture with the polyol component of the reaction mixture without any significant degradation of the polyhalogenated hydrocarbon therein.

The finding that the foams of the present invention possess the same outstanding degree of flame retardancy as the foams of the aforesaid U.S. patent, but have the advantage of being readily fabricated, is not only unexpected but highly useful. The present invention makes it possible, for the first time, to produce flexible foams on a commercial scale for use as cushioning, mattresses, and the like, which pass the very strict requirements of the hot bolt test discussed above, but still possess all the necessary physical properties and appearance required for this use, such as good color and excellent compression set and indentation load deflection.

The following examples describe the manner and process of making and using the invention and set forth the best mode contemplated by the inventors of carrying out the invention but are not to be construed as limiting.

EXAMPLE 1

Table I below sets forth a comparison of properties of a fire retardant flexible Foam A, prepared in accordance with the present invention, with those of Foam B which corresponds in all respects to Foam A except that it does not contain alumina trihydrate. Foams A and B were prepared by mixing the components in a one quart container using an agitator driven at high speed by a drill press motor. The isocyanate component was added last. The components comprised the isocyanate component which consisted of a pre-blend of 70 percent by weight of toluene diisocyanate (80/20 percent ratio by weight of 2,4/2,6 isomer) and 30 percent by weight of a polymethylenepolyphenyl isocyanate containing about 50 percent by weight of methylenebis (phenylisocyanate) the remainder being polymethylene polyphenyl isocyanates of functionality higher than 2.0. The polyol component consisted of a pre-blend prepared by suspending finely divided hexabromobenzene, alumina trihydrate, and antimony trioxide in a liquid polyol mixture consisting of a poly(oxyethyleneoxypropylene)triol of equivalent weight of about 2000, a vinyl modified polyether polyol of equivalent weight of about 1200, and a polyoxypropylenepentol of equivalent weight about 118. The polyol component for Foam B was prepared in the same manner except the alumina trihydrate was deleted from the mixture. The catalyst component consisted of a pre-blend of the N,N,N',N'-tetramethyl-1,3-butanediamine, stannous octoate, 2,2'-bis(dimethylamino)diethyl ether, and a small amount of water for blowing.

The properties of Foam A as outlined in Table I are clearly superior to Foam B in both fire resistance and in physical properties such as compression set and indentation load deflection which are of premier consideration for flexible foams used in cushioning applications.

TABLE I

| Foams | A | B |
|---|---|---|
| Ingredients: | | |
| Component A: | | |
| Isocyanate I[1] | 36.6 | 37.1 |
| Component B: | | |
| Niax 11-27[2] | 43.0 | 48.6 |
| Niax 34-45[3] | 27.0 | 30.4 |
| LA-475[4] | 2.0 | 2.0 |
| Antimony trioxide | 8.2 | 8.2 |
| Alumina trihydrate[5] | 9.0 | — |
| Hexabromobenzene | 10.8 | 10.8 |
| Component C: | | |
| $H_2O$ | 1.6 | 1.6 |
| N,N,N',N'-Tetramethyl-1,3-butanediamine | 3.0 | 3.0 |
| Stannous octoate | 0.05 | 0.05 |
| 2,2'-Bis(dimethylamino)-diethyl ether | 0.1 | 0.1 |
| Properties: | | |
| Density, pcf | 3.74 | 4.04 |
| ILD (in lbs.) | | |
| 25% deflection | 32.0 | 22.0 |
| 65% deflection | 148.0 | 68.0 |
| Compression set at 90%[7] (as %) | 3.7 | 67.0 |
| Tensile str., psi | 11.1 | 12.5 |
| Tear str., pli | 1.1 | 1.2 |
| Elongation % | 88.0 | 97.0 |
| Hot Bolt Test[8]: | | |
| Burn time, seconds | 3.0 | 5.0 |
| Smoking, minutes | 4.0 | 6.0 |
| Volume consumed, cu. in. | 15.0 | 18.0 |
| Static fatigue resistance[9] | no cracking | no cracking |
| Flexing, % set[10] | 1.0 | 25.0 |
| Fire Resistance[11]: | | |
| Length of burn (inches) | 3.2 | 4.1 |
| Burning time (secs.) after flame removal | 0 | 0 |

Footnotes to Table I
[1]Isocyanate I: A blend of 70 percent by weight of toluene diisocyanate (80/20 percent ratio by weight of 2,4/2,6 isomer) and 30 percent by weight of PAPI 901 which is a polymethylenepolyphenyl isocyanate; viscosity, cps. at 25°C=80; isocyanate equivalent=133.
[2]Niax 11-27: A poly(oxyethyleneoxypropylene)triol, equivalent wt.=2000; product of Union Carbide.
[3]Niax 34-45: A vinyl modified polyether triol, equivalent wt.=1200; product of Union Carbide.
[4]LA-475: A polyoxypropylene pentol, equivalent weight=118; product of Union Carbide.
[5]Alumina trihydrate: $Al_2O_3 \cdot 3H_2O$. A product of Kaiser Chemicals sold under the designation H-31-F.
[6]Indentation Load Deflection Test According to ASTM D1564 which measures the lbs. required to give the stated deflection.
[7]Compression Set Test According to ASTM D1056 and shows the permanent set as percent after 90 percent compression.

Table I—Continued

[a] Hot Bolt Test run according to Military Specification Mil R-20092F (20 July 1970) fire resistance requirement 3.5.10, fire resistance test 4.4.9.
[b] Static fatigue resistance test run according to Military Specification Mil R-20092F, 4.4.10.
[c] Flexing test run in accordance with Method 12111 of Fed. Std. 601.
[d] Fire Resistance measured as vertical burn resistance according to DMS 1510-A (McDonnell Douglas) test.

EXAMPLE 2

Table II below shows a comparison of the properties of Foam C, made in accordance with the present invention, and those of Foam D, which is identical to Foam C, except it contains no alumina trihydrate. The same polyisocyanate and procedure as used in Example 1 are employed in the present example except that pentabromoethylbenzene was used instead of hexabromobenzene. In addition, the foams of this example employed glycerine instead of the pentol of Example 1 and the catalyst component contained triethylenediamine instead of the TMBDA and stannous octoate combination of the previous example. The formulations and properties are set forth in Table II. Foam C possesses superior flame resistance and cushioning properties compared with Foam D.

TABLE II

| Foams | C | D |
|---|---|---|
| Ingredients: | | |
| Component A: | | |
| Isocyanate I | 38.6 | 39.1 |
| Component B: | | |
| Niax 11-27 | 54.2 | 61.0 |
| Niax 34-45 | 17.0 | 19.2 |
| Glycerine | 1.0 | 1.0 |
| Antimony trioxide | 8.0 | 8.0 |
| Pentabromoethylbenzene | 10.8 | 10.8 |
| Alumina trihydrate | 9.0 | — |
| Component C: | | |
| $H_2O$ | 2.1 | 2.1 |
| Triethylenediamine | 0.4 | 0.4 |
| 2,2'-Bis(dimethylamino)-diethyl ether | 0.1 | 0.1 |
| Properties: | | |
| Density p.c.f. | 2.46 | 3.01 |
| ILD (in lbs.) | | |
| 25% deflection | 25.0 | 12.0 |
| 65% deflection | 60.0 | 30.0 |
| Compression set at 90% | 8.0 | 47.0 |
| Tensile str., psi | 24.8 | 26.2 |
| Tear str., pli | 1.2 | 1.2 |
| Elongation % | 115.0 | 120.0 |
| Hot Bolt Test: | | |
| Burn time, secs. | 5.0 | 15.0 |
| Smoking, mins. | 4.0 | 5.0 |
| Volume consumed, cu. in. | 14.0 | 13.0 |
| Static fatigue resistance | no cracking | no cracking |
| Flexing, % set | 1.0 | 23.0 |
| Fire Resistance: | | |
| Length of burn (inches) | 3.0 | 6.0 |
| Burning time (secs.) after flame removal | 0 | 0 |

EXAMPLE 3

This Example sets forth another comparison of a foam (Foam E) made in accordance with the invention with a second foam (Foam F) made in an identical manner but omitting the alumina trihydrate. The halogenated aromatic compound employed in these foams was decabromodiphenyl ether. The procedure was identical to the previous Examples however, the isocyanate employed herein was a blend of 80 percent by weight of toluene diisocyanate (65/35 percent ratio by weight of 2,4/2,6 isomer) and 20 percent by weight of a polymethylenepolyphenyl isocyanate containing about 60 percent by weight of methylenebis (phenyl isocyanate) the remainder being polymethylene polyphenyl isocyanates of functionality higher than 2.0. The polyol component mixture was that set forth in Table III and the catalyst component in these foams contained triethylenediamine dissolved in dipropylene glycol along with water and the same diaminodiethyl ether employed in previous Examples. Again, the fire retardance and cushioning properties of Foam E made in accordance with the invention are superior to Foam F which does not contain the alumina trihydrate.

TABLE III

| Foams | E | F |
|---|---|---|
| Ingredients: | | |
| Component A: | | |
| Isocyanate II[1] | 35.1 | 35.6 |
| Component B: | | |
| CP 4701[2] | 49.0 | 55.7 |
| E-274[3] | 17.0 | 19.3 |
| LA475 | 4.0 | 4.0 |
| Antimony trioxide | 8.0 | 8.0 |
| Decabromodiphenyl ether | 12.0 | 12.0 |
| Alumina trihydrate | 10.0 | — |
| Component C: | | |
| $H_2O$ | 1.5 | 1.5 |
| 33LV[4] | 1.2 | 1.2 |
| 2,2'-Bis(dimethylamino)diethyl ether | 0.1 | 0.1 |
| Properties: | | |
| Density p.c.f. | 3.5 | 4.5 |
| ILD (in lbs.) | | |
| 25% deflection | 36.0 | 23.0 |
| 65% deflection | 84.0 | 57.0 |
| Compression set at 90% | 4.0 | 62.0 |
| Tensile str., psi | 26.0 | 27.0 |
| Tear str., pli | 1.1 | 1.2 |
| Elongation % | 110.0 | 112.0 |
| Hot Bolt Test: | | |
| Burn time, secs. | 10.0 | 16.0 |
| Smoking, mins. | 5.0 | 5.5 |
| Vol. consumed, cu. in. | 13.5 | 14.0 |
| Static fatigue resistance | no cracking | no cracking |
| Flexing, % set | 1.5 | 27.0 |
| Fire resistance: | | |
| Length of burn (inches) | 5.8 | 6.8 |
| Burning time (secs.) after flame removal | 0 | 0 |

Footnotes to Table III
[1] Isocyanate II: A blend of 80 percent by weight of toluene diisocyanate (65/35 percent ratio by weight of 2,4/2,6 isomer) and 20 percent by weight of PAPI 901 which is a polymethylenepolyphenyl isocyanate; viscosity, cps at 25°C=80; isocyanate equivalent = 133.
[2] CP4701: a polyoxyalkylene triol supplied by Dow Chemical Co.; equivalent weight = 1670.
[3] E-274: Glycerine based polyoxyalkylene triol, equivalent weight = 970, supplied by Union Carbide.
[4] 33LV: A urethane catalyst supplied by Air Products & Chems. Inc., 33 percent by weight of triethylenediamine dissolved in dipropylene glycol.

We claim:
1. A flame retardant flexible polyurethane foam consisting essentially of the product of reaction, under foam producing conditions, of:
   a. a polyisocyanate mixture which contains from 5 percent to 95 percent by weight of toluene diisocyanate, and from 95 percent to 5 percent by weight of polymethylene polyphenyl polyisocyanate containing from about 40 percent to about 70 percent methylenebis (phenyl isocyanate), the remainder of said polymethylene polyphenyl polyisocyanates having functionality higher than 2.0;

b. a polyether polyol having an equivalent weight from about 500 to about 2500 and a functionality from about 2.0 to about 4.0;

c. from about 2 to about 20 percent by weight, based on weight of final foam, of antimony oxide;

d. from about 1 to about 15 percent by weight, based on weight of final foam, of a polyhalogenated aromatic compound; and e. from about 1 to about 15 percent by weight, based on weight of final foam, of alumina trihydrate.

2. A flame retardant flexible foam according to claim 1 in which the polyisocyanate mixture contains (*a*) approximately 70 percent by weight of toluene diisocyanate and (*b*) 30 percent by weight of polymethylene polyphenyl polyisocyanate in which the content of methylenebis-(phenyl isocyanate) is about 50 percent by weight.

3. A flame retardant flexible foam according to claim 1 in which the polyether polyol is a triol having an equivalent weight from about 900 to about 2300.

4. A flame retardant flexible foam according to claim 1 in which the polyhalogenated member is a polybrominated aromatic compound which is insoluble in water, has a melting point above 50°C and contains at least about 60 percent by weight of bromine.

5. A flame retardant flexible foam according to claim 4 wherein the polybrominated compound is hexabromobenzene.

6. A flame retardant flexible foam according to claim 4 wherein the polybrominated compound is decabromodiphenyl ether.

7. A flame retardant flexible foam according to claim 4 wherein the polybrominated compound is pentabromoethylbenzene.

8. A flame retardant flexible polyurethane foam consisting essentially of the product of reaction, under foam producing conditions of:

a. a polyisocyanate mixture which contains from 5 percent to 95 percent by weight of toluene diisocyanate, and from 95 percent to 5 percent by weight of polymethylene polyphenyl polyisocyanate containing about 50 percent of methylenebis(phenyl isocyanate), the remainder of said polymethylene polyphenyl polyisocyanates having functionality higher than 2.0;

b. a polyether triol having an equivalent weight of about 900 to about 2300;

c. from about 5 to about 15 percent by weight, based on weight of final foam, of antimony oxide;

d. from about 2 to about 10 percent by weight, based on weight of final foam, of a polyhalogenated aromatic compound; and e. from about 2 to about 10 percent by weight, based on weight of final foam, of alumina trihydrate.

9. A flame retardant flexible polyurethane foam according to claim 8 in which the polyhalogenated member is hexabromobenzene.

10. A flame retardant flexible polyurethane foam according to claim 8 in which the polyhalogenated member is decabromodiphenyl ether.

11. A flame retardant flexible polyurethane foam according to claim 8 in which the polyhalogenated member is pentabromoethylbenzene.

* * * * *